United States Patent
Li et al.

(10) Patent No.: US 12,227,462 B2
(45) Date of Patent: Feb. 18, 2025

(54) CARBON FIBER PREFORM, PREPARATION METHOD THEREFOR AND PREPARATION METHOD FOR CARBON/CARBON COMPOSITES

(71) Applicant: SHAOXING RESEARCH INSTITUTE OF SHANGHAI UNIVERSITY, Zhejiang (CN)

(72) Inventors: Aijun Li, Zhejiang (CN); Lixin Ning, Zhejiang (CN); Zhiwei Kang, Zhejiang (CN); Zhiwei Li, Zhejiang (CN); Liquan Chen, Zhejiang (CN); Liqi Liu, Zhejiang (CN); Lintao Jia, Zhejiang (CN); Mengqian Wang, Zhejiang (CN)

(73) Assignee: SHAOXING RESEARCH INSTITUTE OF SHANGHAI UNIVERSITY, Shaoxing (CN)

( * ) Notice: Subject to any disclaimer, the term of this patent is extended or adjusted under 35 U.S.C. 154(b) by 0 days.

(21) Appl. No.: 18/704,893

(22) PCT Filed: Aug. 24, 2022

(86) PCT No.: PCT/CN2022/114492
§ 371 (c)(1),
(2) Date: Sep. 4, 2024

(87) PCT Pub. No.: WO2023/025190
PCT Pub. Date: Mar. 2, 2023

(65) Prior Publication Data
US 2024/0417334 A1    Dec. 19, 2024

(30) Foreign Application Priority Data
Aug. 25, 2021    (CN) .......................... 202110978789.8

(51) Int. Cl.
C04B 35/83    (2006.01)
B32B 5/02    (2006.01)
(Continued)

(52) U.S. Cl.
CPC ................ C04B 35/83 (2013.01); B32B 5/02 (2013.01); B32B 5/26 (2013.01); B32B 37/18 (2013.01);
(Continued)

(58) Field of Classification Search
CPC .......... B32B 2262/106; B32B 2305/18; B32B 37/18; B32B 37/24; B32B 2307/7376;
(Continued)

(56) References Cited

FOREIGN PATENT DOCUMENTS

| CN | 102659441 A | 9/2012 |
|----|-------------|--------|
| CN | 108756287 A | 11/2018 |

(Continued)

*Primary Examiner* — Camie S Thompson

(57) ABSTRACT

Disclosed is a carbon fiber preform, a preparation method therefor and a preparation method for carbon/carbon composites, falling within the technical field of composites. The carbon fiber preform provided by the present disclosure includes a plurality of stacked carbon fiber cloths and prestressed layers arranged between every two of adjacent carbon fiber cloths, the prestressed layer including a boron-containing phenol-formaldehyde resin coating and carbon fiber bundles distributed within the boron-containing phenol-formaldehyde resin coating. In the present disclosure, the prestressed layers are formed by adding the carbon fiber bundles and a boron-containing phenol-formaldehyde resin precursor to a two dimensional (2D) stacked preform, thereby counteracting internal stresses during carbonization and obtaining a carbon/carbon composite having higher strength and being less prone to cracking.

11 Claims, 3 Drawing Sheets

(51) Int. Cl.
*B32B 5/26* (2006.01)
*B32B 37/18* (2006.01)
*B32B 37/24* (2006.01)
*C04B 35/628* (2006.01)
*C04B 35/64* (2006.01)

(52) U.S. Cl.
CPC ........ *B32B 37/24* (2013.01); *C04B 35/62844* (2013.01); *C04B 35/62886* (2013.01); *C04B 35/64* (2013.01); *B32B 2037/243* (2013.01); *B32B 2255/02* (2013.01); *B32B 2255/26* (2013.01); *B32B 2262/106* (2013.01); *B32B 2305/18* (2013.01); *B32B 2307/7376* (2023.05); *C04B 2235/422* (2013.01); *C04B 2235/486* (2013.01); *C04B 2235/5248* (2013.01); *C04B 2235/5256* (2013.01); *C04B 2235/6567* (2013.01)

(58) Field of Classification Search
CPC .......... B32B 2307/243; B32B 2555/26; B32B 2555/02; B32B 5/02; B32B 5/26; C04B 2235/5256; C04B 2235/5248; C04B 2235/422; C04B 35/83; C04B 35/64; C04B 35/62844; C04B 35/62855
USPC ..................................................... 428/299.1
See application file for complete search history.

(56) References Cited

FOREIGN PATENT DOCUMENTS

CN 109437956 * 3/2019
CN 113563097 A 10/2021

* cited by examiner

CARBON FIBER PREFORM, PREPARATION METHOD THEREFOR AND PREPARATION METHOD FOR CARBON/CARBON COMPOSITES

TECHNICAL FIELD

The present disclosure relates to the technical field of composites, and more particularly to a carbon fiber preform, a preparation method therefor and a preparation method for a carbon/carbon composite.

BACKGROUND

A carbon fiber reinforced carbon matrix composite (a carbon/carbon composite) is a high strength composite obtained by processing with a carbon fiber or a carbon fiber braided body as a reinforcing material and graphite or carbon as a matrix. The carbon/carbon composite has many excellent properties such as light weight, high specific strength, high specific modulus, low expansion coefficient, and thermal shock resistance. Therefore, the carbon/carbon composite is widely applied in the manufacture of nose cone caps of intercontinental missile heads, aircraft brakes, throat linings and expansion sections of sprayer nozzles of solid rockets, and nose cone caps and wing leading edges of space shuttles.

The most commonly used process methods for preparing carbon/carbon composites are chemical vapor deposition and precursor immersion pyrolysis (PIP). PIP is to use porous carbon fiber woven pieces as a preform, and pitch or a polymer as a precursor. A liquid precursor is fully impregnated into a porous preform by liquid impregnation. The precursor is pyrolyzed at a high temperature to generate pyrolytic carbon, and finally the carbon/carbon composites are formed. Existing carbon fiber preforms include two-dimensional (2D) carbon fiber preforms, 2.5-dimensional (2.5D) carbon fiber preforms, and three-dimensional (3D) carbon fiber preforms. However, when the pyrolytic carbon is generated from these carbon fiber preforms at a high temperature, an internal stress is generated due to volume expansion, which destroys the properties of the prepared carbon/carbon composites and even causes cracking.

A carbon/carbon composite preform is disclosed in the Chinese patent of CN105859303A, in which a short carbon fiber is used, phenolic-based nano-glues are introduced into the short carbon fiber preform by in-situ polymerization, carbonized and converted into nano-carbon glues to form a 3D continuous nano-carbon skeleton. This method is easy to operate and has a short cycle time, but the prepared preform cannot solve the problem of the generation of internal stress caused by the volume expansion of the preform with the increase of density during carbonization, resulting in the decrease of mechanical properties.

SUMMARY

An object of the present disclosure is to provide a carbon fiber preform, a preparation method therefor and a preparation method for carbon/carbon composites. The carbon fiber preform provided in the present disclosure can counteract an internal stress during carbonization to obtain a carbon/carbon composite having more excellent mechanical properties and being less prone to cracking.

In order to achieve the above object, the present disclosure provides the following technical solutions.

The present disclosure provides a carbon fiber preform, including a plurality of stacked carbon fiber cloths and prestressed layers arranged between every two of adjacent carbon fiber cloths, the prestressed layer including a boron-containing phenol-formaldehyde resin coating and carbon fiber bundles distributed within the boron-containing phenol-formaldehyde resin coating.

Preferably, the carbon fiber cloth has a thickness of 0.1-0.2 mm; and the prestressed layer has a thickness of 1.0-3.0 mm.

Preferably, a mass content of the carbon fiber bundles in the prestressed layer is 1.5-2.5%; and a mass content of the boron-containing phenol-formaldehyde resin in the prestressed layer is 97.5-98.5%.

The present disclosure provides a preparation method for a carbon fiber preform described in the above technical solution, including the steps of:
(1) coating an upper surface of a carbon fiber cloth with a boron-containing phenol-formaldehyde resin slurry to obtain a wet boron-containing phenol-formaldehyde resin coating;
(2) placing bent carbon fiber bundles in the wet boron-containing phenol-formaldehyde resin coating to obtain a wet prestressed layer;
(3) placing another carbon fiber cloth on an upper surface of the wet prestressed layer; and
(4) repeating steps (1) to (3) at least once, and curing the obtained wet preform to obtain a carbon fiber preform.

Preferably, in the boron-containing phenol-formaldehyde resin slurry of step (1), a mass ratio of a boron-containing phenol-formaldehyde resin to the carbon fiber cloth is 3-5:2.

Preferably, in the boron-containing phenol-formaldehyde resin slurry of step (1), a mass content of the boron-containing phenol-formaldehyde resin is 50-75%.

Preferably, the carbon fiber bundle in step (2) has a bending curvature of 1.0-3.0 rad.

Preferably, the carbon fiber bundle in step (2) has a diameter of 0.45-0.55 mm, number of 5-10 bundles and a fiber density of 1.76-1.80 g/cm$^3$.

The present disclosure provides a preparation method for carbon/carbon composites, including the steps of: carbonizing a carbon fiber preform to obtain a carbon/carbon composite, the carbon fiber preform being a carbon fiber preform described in the above technical solution or a carbon fiber preform prepared by a preparation method described in the above technical solution.

Preferably, the carbonizing is performed at a temperature of 800-850° C. for a temperature-holding time of 3-4 h under a protective atmosphere condition.

The present disclosure provides a carbon fiber preform, including a plurality of stacked carbon fiber cloths and prestressed layers arranged between every two of adjacent carbon fiber cloths, the prestressed layer including a boron-containing phenol-formaldehyde resin coating and carbon fiber bundles distributed within the boron-containing phenol-formaldehyde resin coating. In the present disclosure, the prestressed layers are formed by adding the carbon fiber bundles and a boron-containing phenol-formaldehyde resin precursor to a 2D stacked preform, thereby counteracting an internal stress during carbonization and obtaining a carbon/carbon composite having higher strength and being less prone to cracking.

The present disclosure also provides a preparation method for a carbon fiber preform describe in the technical solution. In the present disclosure, a boron-containing phenol-formaldehyde resin, as a precursor, is smeared between carbon fiber layers after carbon fiber cloths are stacked, and bent carbon fiber bundles are added to form prestressed layers, so that a carbon fiber preform containing prestressed layers is prepared. In the preparation of the carbon/carbon composite, the carbon fiber preform containing the prestressed layers can counteract an internal stress caused by the volume expansion at a high temperature, improve the mechanical properties of the prepared carbon/carbon composite and avoid the cracking of the composite caused by the internal stress.

BRIEF DESCRIPTION OF THE DRAWINGS

In FIGS. 3 to 4, 1 represents a carbon fiber cloth; 2 represents a boron-containing phenol-formaldehyde resin coating; and 3 represents a carbon fiber bundle.

DETAILED DESCRIPTION

Figure 1:
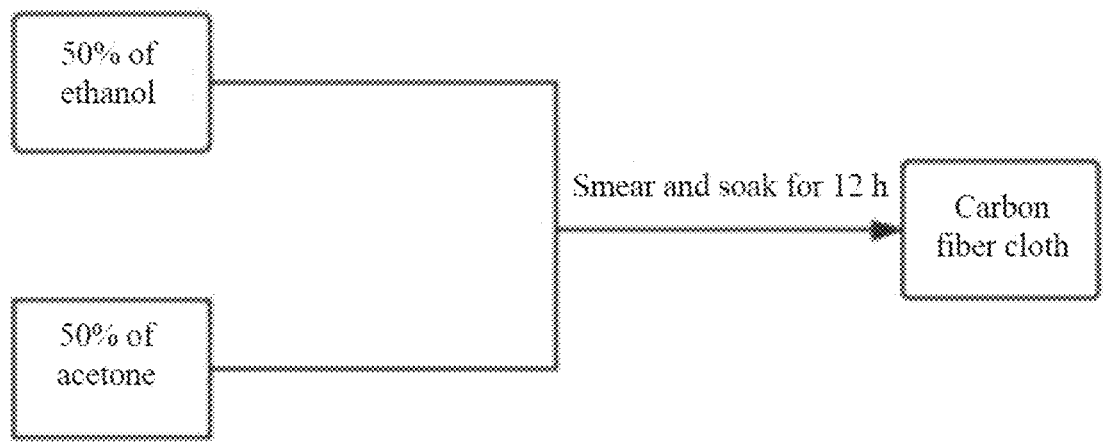
FIG. 1 is a process flow chart of the slurry removal of carbon fiber cloths and carbon fiber bundles.

The present disclosure provides a carbon fiber preform, including a plurality of stacked carbon fiber cloths and prestressed layers arranged between every two of adjacent carbon fiber cloths, the prestressed layer including a boron-containing phenol-formaldehyde resin coating and carbon fiber bundles distributed within the boron-containing phenol-formaldehyde resin coating.

The carbon fiber preform provided by the present disclosure includes the plurality of stacked carbon fiber cloths. In the present disclosure, the number of layers of the carbon fiber cloths is preferably 5-10 layers. In the present disclosure, a thickness of the carbon fiber cloth is preferably 0.1-0.2 mm, more preferably 0.18 mm; and a fiber density of the carbon fiber cloth is preferably 1.76-1.80 g/cm$^3$. In the present disclosure, the carbon fiber cloth is preferably a plain carbon fiber cloth.

The carbon fiber preform provided by the present disclosure includes the prestressed layers arranged between every two of adjacent carbon fiber cloths. In the present disclosure, a thickness of the prestressed layer is preferably 1.0-3.0 mm, more preferably 2.0 mm.

In the present disclosure, the prestressed layer includes a boron-containing phenol-formaldehyde resin coating and carbon fiber bundles distributed within the boron-containing phenol-formaldehyde resin coating. In the present disclosure, a position of the carbon fiber bundles in the boron-containing phenol-formaldehyde resin coating is preferably a central position. In the present disclosure, a bending curvature of the carbon fiber bundle is preferably 1.0-3.0 rad, more preferably 1.79-1.83 rad. In the present disclosure, the bending curvature refers to a radian value obtained by dividing an arc length by a radius. In the present disclosure, a diameter of the carbon fiber bundle is preferably 0.45-0.55 mm, more preferably 0.50 mm; the number of the carbon fiber bundles is preferably 5-10 bundles, more preferably 5 bundles; and a fiber density of the carbon fiber bundle is preferably 1.76-1.80 g/cm$^3$.

In the present disclosure, a mass content of the carbon fiber bundles in the prestressed layer is preferably 1.5-2.5%, more preferably 2.0-2.3%; and a mass content of the boron-containing phenol-formaldehyde resin in the prestressed layer is preferably 97.5-98.5%, more preferably 97.7-98.0%.

In the present disclosure, a prestressed layer is added between the carbon fiber cloth layers to counteract an internal stress generated during the preparation of a carbon/carbon composite to obtain a carbon/carbon composite having higher strength.

The present disclosure also provides a preparation method for a carbon fiber preform described in the above technical solution, including the following steps.

In (1): an upper surface of a carbon fiber cloth is coated with a boron-containing phenol-formaldehyde resin slurry to obtain a wet boron-containing phenol-formaldehyde resin coating.

In (2): bent carbon fiber bundles are placed in the wet boron-containing phenol-formaldehyde resin coating to obtain a wet prestressed layer.

In (3): another carbon fiber cloth is placed on an upper surface of the wet prestressed layer.

In (4): steps (1) to (3) are repeated at least once, and the obtained wet preform is cured to obtain a carbon fiber preform.

The preparation method provided by the present disclosure is simple, short in cycle, low in cost, excellent in performance, and easy to be industrially produced.

Since carbon fibers are worn out during transportation, a slurry is usually added to the carbon fiber at the end of a carbon fiber production line to protect the carbon fiber. Therefore, in the present disclosure, in order to avoid the influence of the slurry on the preparation of a carbon fiber preform, it is necessary to pretreat carbon fiber cloths and carbon fiber bundles to remove the slurry. In the present disclosure, the carbon fiber cloth and the carbon fiber bundle used are preferably a slurry-removed carbon fiber cloth and a slurry-removed carbon fiber bundle; and the slurry-removed method preferably includes that: a carbon fiber cloth or a carbon fiber bundle is soaked in a slurry-removed solution for slurry removal. In the present disclosure, the slurry-removed solution preferably consists of 50 vol % of ethanol and 50 vol % of acetone; and the soaking is preferably performed at room temperature for a preferable soaking time of 12 h. In the present disclosure, preferably, the obtained carbon fiber cloth or carbon fiber bundle are sequentially washed and dried after the slurry removal to obtain a slurry-removed carbon fiber cloth and a slurry-removed carbon fiber bundle. In the present disclosure, the washing is preferably deionized water washing; and the drying is performed at a preferable temperature of 110° C. for a preferable time of 6 h.

In the present disclosure, the upper surface of the carbon fiber cloth is coated with the boron-containing phenol-formaldehyde resin slurry to obtain the wet boron-containing phenol-formaldehyde resin coating. In the present disclosure, a mass content of the boron-containing phenol-formaldehyde resin in the boron-containing phenol-formaldehyde resin slurry is preferably 50-75%, more preferably 75%; and a mass content of boron in the boron-containing phenol-formaldehyde resin is preferably 9%. In a specific example of the present disclosure, the manufacturer of the boron-containing phenol-formaldehyde resin is Shandong Jiaying Chemical Technology Co. Ltd.

In the present disclosure, a solvent of the boron-containing phenol-formaldehyde resin slurry is preferably absolute ethanol.

In the present disclosure, a mass ratio of the boron-containing phenol-formaldehyde resin to the carbon fiber cloth in the boron-containing phenol-formaldehyde resin slurry is preferably 3-5:2, more preferably 3-4:2.

In the present disclosure, the coating method is preferably smearing.

After the wet boron-containing phenol-formaldehyde resin coating is obtained, in the present disclosure, bent carbon fiber bundles are placed in the wet boron-containing phenol-formaldehyde resin coating to obtain a wet prestressed layer. In the present disclosure, the addition of the bent carbon fiber bundles can apply prestress to the preform. In the present disclosure, parameters of the carbon fiber bundles are consistent with those described above, and are not described again here.

After the wet prestressed layer is obtained, in the present disclosure, another carbon fiber cloth is placed on an upper surface of the wet prestressed layer. In the present disclosure, the another carbon fiber cloth preferably conforms to the physical properties and dimension of the carbon fiber cloth described above.

In the present disclosure, the above steps are repeated at least once, and the obtained wet preform is cured to obtain a carbon fiber preform. In the present disclosure, the number of repetitions of the above steps is preferably determined according to actual product demands, and in a specific example of the present disclosure, the above steps are preferably repeated for 3 times to obtain a carbon fiber preform containing four prestressed layers.

In the present disclosure, the curing is performed at a preferable temperature of 140-180° C., more preferable 150-160° C. for a preferable time of 5-7 h, more preferable 6 h. In a curing process of the present disclosure, the wet boron-containing phenol-formaldehyde resin coating is cured to firmly bond the carbon fiber bundles between the carbon fiber cloth layers.

The present disclosure also provides a preparation method for carbon/carbon composites described in the above solution, including the step of: carbonizing a carbon fiber preform to obtain a carbon/carbon composite, the carbon fiber preform being a carbon fiber preform described in the above technical solution or a carbon fiber preform prepared by a preparation method described in the above technical solution.

In the present disclosure, the carbonizing is performed at a preferable temperature of 800-850° C., more preferable 800° C., for a preferable temperature-holding time of 3-4 h, more preferable 3 h, under a preferable protective atmosphere condition, more preferable an argon atmosphere. In the present disclosure, the boron-containing phenol-formaldehyde resin in the carbon fiber preform is used as a precursor, and in a carbonization process, the boron-containing phenol-formaldehyde resin undergoes a cracking reaction to generate pyrolytic carbon, and finally a carbon/carbon composite is formed.

In the present disclosure, preferably, after carbonization, the obtained material is cooled with a furnace to obtain the carbon/carbon composite.

In the present disclosure, the carbon/carbon composite has a preferable bending strength of 56.53-70.43 MPa and a preferable shear strength of 3.86-5.42 MPa. No obvious cracks are observed in cross and longitudinal sections of the carbon/carbon composite prepared by the present disclosure, indicating that the carbon fiber preform provided by the present disclosure can counteract an internal stress generated when the carbon/carbon composite is carbonized, and the prepared carbon/carbon composite is not easy to crack.

Technical solutions of the present disclosure are described clearly and completely in the following with reference to the examples of the present disclosure. Obviously, all the described examples are only some, rather than all examples of the present disclosure. Based on the examples in the present disclosure, all other examples obtained by those of ordinary skill in the art without creative efforts belong to the scope of protection of the present disclosure.

Slurry removal is performed on carbon fiber cloths and carbon fiber bundles used in examples and comparative examples according to a process shown in FIG. 1 to obtain slurry-removed carbon fiber cloths and slurry-removed carbon fiber bundles. Steps are as follows.

A slurry-removed solution containing 50 vol % of absolute ethanol and 50 vol % of acetone is prepared; and the carbon fiber cloths or carbon fiber bundles are soaked in the slurry-removed solution for 12 h, washed with deionized water after being fished out, and dried in an oven at a temperature of 110° C. for 6 h to obtain the slurry-removed carbon fiber cloths and the slurry-removed carbon fiber bundles.

Example 1

Figure 2:
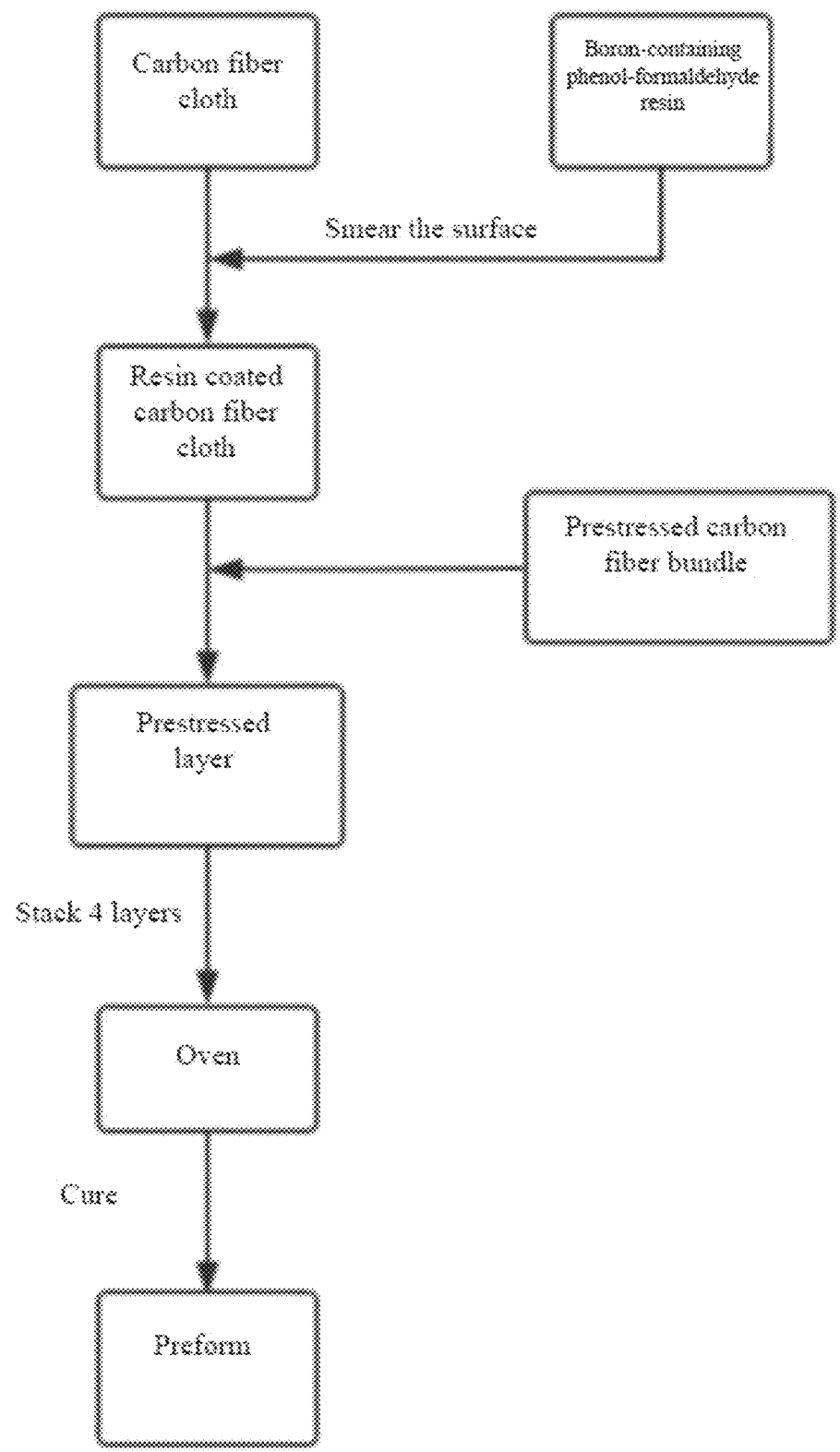
FIG. 2 is a process flow chart for preparing a carbon fiber preform.

A carbon fiber preform was prepared according to a process shown in FIG. 2.

A plain carbon fiber cloth (TORAY T300-12K, Japan, with a fiber density of 1.76 g/cm$^3$) was cut into a size of 28 cm×28 cm, and slurry-removed to obtain 5 slurry-removed carbon fiber cloths.

Carbon fiber bundles (TORAY T300-12K, Japan, with a fiber density of 1.76 g/cm$^3$) were slurry-removed to obtain the slurry-removed carbon fiber bundles.

4 slurry-removed carbon fiber cloths were weighed, and a mass was 112 g; and according to a mass ratio of the carbon fiber cloths to a boron-containing phenol-formaldehyde resin=2:3, 168 g of boron-containing phenol-formaldehyde resin was weighed and diluted to 75 wt % with absolute ethanol to obtain a boron-containing phenol-formaldehyde resin slurry.

The boron-containing phenol-formaldehyde resin slurry was divided into 4 equal parts, and 1 part of boron-containing phenol-formaldehyde resin slurry was uniformly smeared onto one carbon fiber cloth; 5 slurry-removed carbon fiber bundles were taken, and the slurry-removed carbon fiber bundles were cut into a length of 35 cm, bent into an arc of 1.79 and placed into a smeared boron-containing phenol-formaldehyde resin coating for fixation to form a wet prestressed layer; and another carbon fiber cloth was stacked on the wet prestressed layer, the above steps were repeated until there were 4 layers of wet prestressed layers, and then a carbon fiber cloth was placed on the top.

The prepared preform was put into a vacuum oven and kept at 160° C. for 6 h to obtain the carbon fiber preform.

Figure 3:
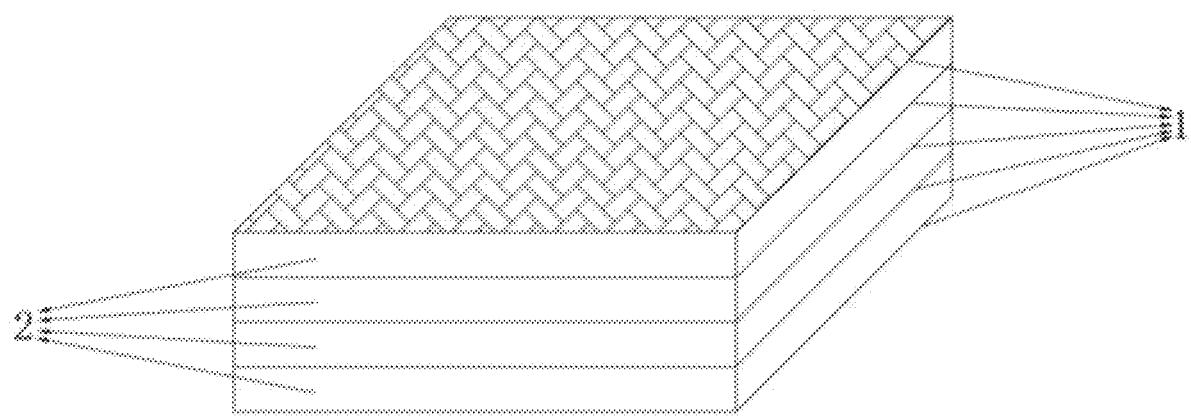
FIG. 3 is a schematic structural diagram of the carbon fiber preform.
Figure 4:
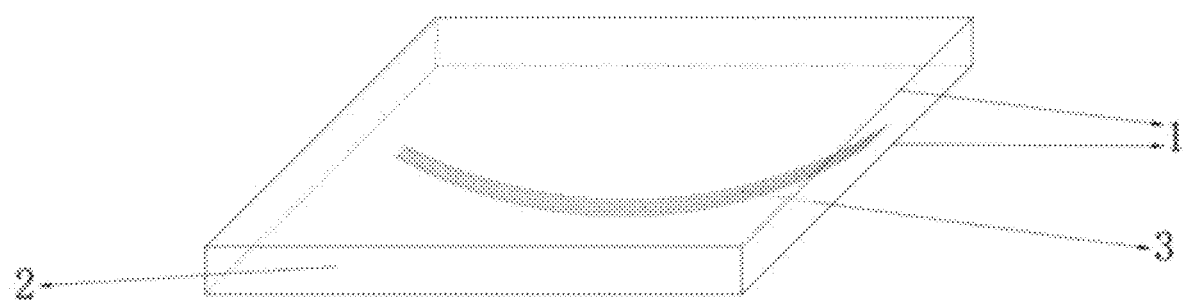
FIG. 4 is a top view of the carbon fiber preform.

The carbon fiber preform prepared in the example was shown in FIGS. 3 and 4, including 5 layers of carbon fiber cloths and prestressed layers arranged between every two of adjacent carbon fiber cloths; and the prestressed layer consists of the boron-containing phenol-formaldehyde resin coating and carbon fiber bundles distributed within the boron-containing phenol-formaldehyde resin coating. A thickness of the carbon fiber cloth in the carbon fiber preform prepared in the example is 0.18 mm; a thickness of the prestressed layer is 2.05 mm; a mass content of the carbon fiber bundles in the prestressed layer is 2.3%; and a mass content of the boron-containing phenol-formaldehyde resin in the prestressed layer is 97.7%.

Application Example 1

A carbon fiber preform prepared in Example 1 was put into a chemical vapor infiltration furnace, kept at 800° C. in an argon atmosphere for 3 h, subjected to a carbonization treatment, and taken out after the furnace was cooled to obtain a carbon/carbon composite.

Comparative Example 1

The addition of carbon fiber bundles prepared in Example 1 was omitted, that is, no prestressed layer was included, and the remaining experimental steps were the same as in Example 1 to obtain a carbon fiber preform.

Comparative Application Example 1

A carbon/carbon composite was prepared by the method of Application Example 1 using a carbon fiber preform of Comparative Example 1.

Test Example 1

Carbon/carbon composites prepared in Application Example 1 and Comparative Application Example 1 were placed on a universal testing machine and subjected to three-point bending and shear tests.

The carbon/carbon composite of Application Example 1 has a bending strength of 56.53 MPa and a shear strength of 3.86 MPa; and the carbon/carbon composite of Comparative Application Example 1 has a bending strength of 50.32 MPa and a shear strength of 3.65 MPa. The bending strength and shear strength of the carbon/carbon composite of Application Example 1 is increased by 12.3% and 5.8%, respectively, compared to Comparative Application Example 1. The results show that the existence of prestressed layers can counteract an internal stress of the carbon/carbon composite and improve the mechanical properties.

The carbon/carbon composites prepared in Application Example 1 and Comparative Application Example 1 were observed in cross and longitudinal sections. The carbon/carbon composite prepared in Comparative Application Example 1 has some fine cracks in the cross and longitudinal sections, and the carbon/carbon composite prepared in Application Example 1 has no obvious cracks in the cross and longitudinal sections. This is because the prestress counteracts an internal stress generated when the carbon/carbon composite is carbonized, and the prepared carbon/carbon composite is not easy to crack.

Example 2

A carbon fiber preform was prepared according to a process shown in FIG. 2.

A plain carbon fiber cloth (TORAY T700-12K, Japan, with a fiber density of 1.80 g/cm$^3$) was cut into a size of 28 cm×28 cm, and slurry-removed to obtain 5 slurry-removed carbon fiber cloths.

Carbon fiber bundles (TORAY T700-12K, Japan, with a fiber density of 1.80 g/cm$^3$) were slurry-removed to obtain the slurry-removed carbon fiber bundles.

4 slurry-removed carbon fiber cloths were weighed, and a mass was 174 g; and according to a mass ratio of the carbon fiber cloths to a boron-containing phenol-formaldehyde resin=2:3, 261 g of boron-containing phenol-formaldehyde resin was weighed and diluted to 75 wt % with absolute ethanol to obtain a boron-containing phenol-formaldehyde resin slurry.

The boron-containing phenol-formaldehyde resin slurry was divided into 4 equal parts, and 1 part of the boron-containing phenol-formaldehyde resin slurry was uniformly smeared onto one carbon fiber cloth; 5 slurry-removed carbon fiber bundles were taken, and the slurry-removed carbon fiber bundles were cut into a length of 35 cm, bent into an arc of 1.83 and placed into a smeared boron-containing phenol-formaldehyde resin coating for fixation to form a wet prestressed layer; and another carbon fiber cloth was stacked on the wet prestressed layer, the above steps were repeated until there were 4 layers of wet prestressed layers, and then a carbon fiber cloth was placed on the top.

The prepared preform was put into a vacuum oven and kept at 160° C. for 6 h to obtain the carbon fiber preform.

The carbon fiber preform prepared in the example was shown in FIGS. 3 and 4, including 5 layers of carbon fiber cloths and prestressed layers arranged between every two of adjacent carbon fiber cloths; and the prestressed layer consists of the boron-containing phenol-formaldehyde resin coating and carbon fiber bundles distributed within the boron-containing phenol-formaldehyde resin coating. A thickness of the carbon fiber cloth in the carbon fiber preform prepared in the example is 0.19 mm; a thickness of the prestressed layer is 2.1 mm; a mass content of the carbon fiber bundles in the prestressed layer is 1.5%; and a mass content of the boron-containing phenol-formaldehyde resin in the prestressed layer is 98.5%.

Application Example 2

A carbon fiber preform prepared in Example 2 was put into a chemical vapor infiltration furnace, kept at 800° C. in an argon atmosphere for 3 h, subjected to a carbonization treatment, and taken out after the furnace was cooled to obtain a carbon/carbon composite.

Comparative Example 2

The addition of carbon fiber bundles prepared in Example 2 was omitted, that is, no prestressed layer was included, and the remaining experimental steps were the same as in Example 2 to obtain a carbon fiber preform.

Comparative Application Example 2

A carbon/carbon composite was prepared by the method of Application Example 2 using a carbon fiber preform of Comparative Example 2.

Test Example 2

Carbon/carbon composites prepared in Application Example 2 and Comparative Application Example 2 were placed on a universal testing machine and subjected to three-point bending and shear tests.

The carbon/carbon composite of Application Example 2 has a bending strength of 70.43 MPa and a shear strength of 5.42 MPa; and the carbon/carbon composite of Comparative Application Example 2 has a bending strength of 65.32 MPa and a shear strength of 4.85 MPa. The bending strength and shear strength of the carbon/carbon composite of Application Example 2 is increased by 7.8% and 11.8%, respectively, compared to Comparative Application Example 2. The results show that the existence of prestressed layers can counteract an internal stress of the carbon/carbon composites and improve the mechanical properties.

The carbon/carbon composites prepared in Application Example 2 and Comparative Application Example 2 were observed in cross and longitudinal sections. The carbon/carbon composite prepared in Comparative Application Example 2 has some fine cracks in the cross and longitudinal sections, and the carbon/carbon composite prepared in Application Example 2 has no obvious cracks in the cross and longitudinal sections. This is because the prestress counteracts an internal stress generated when the carbon/carbon composite is carbonized, and the prepared carbon/carbon composite is not easy to crack.

In the present disclosure, the internal stress generated during the preparation of the carbon/carbon composite is counteracted by adding the prestressed layers containing the carbon fiber bundles to a 2D stacked carbon fiber preform, thereby improving the mechanical properties of the carbon/carbon composite and avoiding the occurrence of cracking during the preparation of the composite. In the present disclosure, the prestressed layer can be prepared by a simple smearing-stacking method, which is simple in preparation, low in cost and suitable for large-scale industrial production.

The above is only the preferred example of the present disclosure, and it is to be pointed out that those skilled in the art can make several improvements and embellishments without departing from the principle of the present disclosure, and these improvements and embellishments are also to be regarded as the protection scope of the present disclosure.

The invention claimed is:

1. A carbon fiber preform, comprising a plurality of stacked carbon fiber cloths and prestressed layers arranged between every two of adjacent carbon fiber cloths, the prestressed layer comprising a boron-containing phenolic resin coating and carbon fiber bundles distributed within the boron-containing phenolic resin coating,
the carbon fiber bundle having a bending curvature of 1.0-3.0 rad.

2. The carbon fiber preform according to claim 1, wherein the carbon fiber cloth has a thickness of 0.1-0.2 mm; and the prestressed layer has a thickness of 1.0-3.0 mm.

3. The carbon fiber preform according to claim 2, wherein a mass content of the carbon fiber bundles in the prestressed layer is 1.5-2.5%; and a mass content of a boron-containing phenolic resin in the prestressed layer is 97.5-98.5%.

4. The carbon fiber preform according to claim 1, wherein a mass content of the carbon fiber bundles in the prestressed layer is 1.5-2.5%; and a mass content of a boron-containing phenolic resin in the prestressed layer is 97.5-98.5%.

5. A preparation method for a carbon fiber preform according to claim 1, comprising the steps of:
(1) coating an upper surface of a carbon fiber cloth with a boron-containing phenolic resin slurry to obtain a wet boron-containing phenolic resin coating;
(2) placing bent carbon fiber bundles in the wet boron-containing phenolic resin coating to obtain a wet prestressed layer;
(3) placing another carbon fiber cloth on an upper surface of the wet prestressed layer; and
(4) repeating steps (1) to (3) at least once, and curing the obtained wet preform to obtain a carbon fiber preform.

6. The preparation method according to claim 5, wherein in the boron-containing phenolic resin slurry of step (1), a mass ratio of a boron-containing phenolic resin to the carbon fiber cloth is 3-5:2.

7. The preparation method according to claim 6, wherein in the boron-containing phenolic resin slurry of step (1), a mass content of the boron-containing phenolic resin is 50-75%.

8. The preparation method according to claim 5, wherein in the boron-containing phenolic resin slurry of step (1), a mass content of the boron-containing phenolic resin is 50-75%.

9. The preparation method according to claim 5, wherein the carbon fiber bundle in step (2) has a diameter of 0.45-0.55 mm, number of 5-10 bundles and a fiber density of 1.76-1.80 g/cm$^3$.

10. A preparation method for carbon/carbon composites, comprising the steps of: carbonizing a carbon fiber preform to obtain a carbon/carbon composite, the carbon fiber preform being a carbon fiber preform prepared by a preparation method according to claim 5.

11. The preparation method according to claim 10, wherein the carbonizing is performed at a temperature of 800-850° C. for a temperature-holding time of 3-4 h under a protective atmosphere condition.

* * * * *